United States Patent [19]

Shoupp et al.

[11] 3,888,658
[45] June 10, 1975

[54] PROCESS FOR THE DIRECT REDUCTION OF IRON ORE TO STEEL
[75] Inventors: William E. Shoupp; James H. Bechtold, both of Pittsburgh, Pa.
[73] Assignee: Westinghouse Electric Corporation, Pittsburgh, Pa.
[22] Filed: Jan. 22, 1973
[21] Appl. No.: 325,483

Related U.S. Application Data
[63] Continuation of Ser. No. 86,203, Nov. 2, 1970, abandoned.

[52] U.S. Cl. ........................................ 75/11; 75/26
[51] Int. Cl. ........................ C21c 5/52; C21b 1/02
[58] Field of Search ................. 75/9, 26, 34, 10–12

[56] References Cited
UNITED STATES PATENTS
2,894,831    7/1959    Old ............................................. 75/9
2,915,379   12/1959    Agarwal .................................... 75/26
3,246,978    4/1966    Porter ....................................... 75/26

Primary Examiner—L. Dewayne Rutledge
Assistant Examiner—Peter D. Rosenberg
Attorney, Agent, or Firm—R. T. Randig

[57] ABSTRACT

A process for producing steel is disclosed in which a carbonaceous fuel is combusted to form a plurality of gases. A portion of the gases are fed to a fluidized bed reactor containing iron ore and the balance are fed to a gas turbine and boiler. Heat from the combustion of the fuel is used inter alia for steam generation which is thereafter channeled to a steam turbine connected to a generator. The gas turbine is also connected to a generator. The product of the fluidized bed reactor which is iron particles forms the charge to an electric arc furnace. Additional ingredients including scrap and fluxes are also charged to the electric arc furnace which is powered by the output from the generators. The product from the electric arc furnace is steel.

5 Claims, 2 Drawing Figures

PROCESS FOR THE DIRECT REDUCTION OF IRON ORE TO STEEL

This is a continuation of application Ser. No. 86,203 filed Nov. 2, 1970, now abandoned.

BACKGROUND OF THE INVENTION

1. Field of the Invention

This invention relates to a steel making process. More particularly, it pertains to a process for the direct reduction of iron ore to iron metal with hydrogen and carbon monoxide in a fluidized bed by a continuous procedure employing (1) a gas generator-chemical separation plant for the production of CO and/or $H_2$ to be used in the fluidized bed for iron ore reduction and (2) a steel making furnace for converting the iron metal to steel.

2. Description of the Prior Art

As is well-known, the accepted commercial method for making steel in the United States as well as elsewhere has been to reduce iron ore in a blast furnace and then refine the resulting iron metal in a suitable furnace, such as an open hearth, basic oxygen, or electric arc furnace. From time to time various procedures for the direct reduction of iron ore to iron metal have been considered. Generally, all of those methods have involved the same fundamental chemistry, but different techniques have been employed. U.S. Pat. No. 3,052,533 discloses a process for the direct reduction of iron ore with a gas comprising CO, $H_2$, and $N_2$. In conjunction therewith, a gas turbine is employed to generate power for an electric furnace for refining the iron into steel.

The primary disadvantage of all prior known methods for the direct reduction of iron ore to iron metal and its refinement to steel has been the inordinate cost. Several factors contribute to the cost including expensive coking coal, voluminous slag which must be handled and disposed, and inefficient employment of fuel and heat energy generally throughout a plant. Other factors such as cost of other materials such as water, gases and fluxing agents and services including electric power also have influenced the specific method employed.

SUMMARY OF THE INVENTION

In accordance with the invention it has been found that the foregoing difficulties may be overcome by providing an integrated and coordinated steel plant that employs coal gasification, direct reduction of iron ore, arc melting steel refining, and on-site production of electric power using both gas and steam turbines to utilize heat energy most efficiently.

DESCRIPTION OF THE PREFERRED EMBODIMENTS

Figure 1:
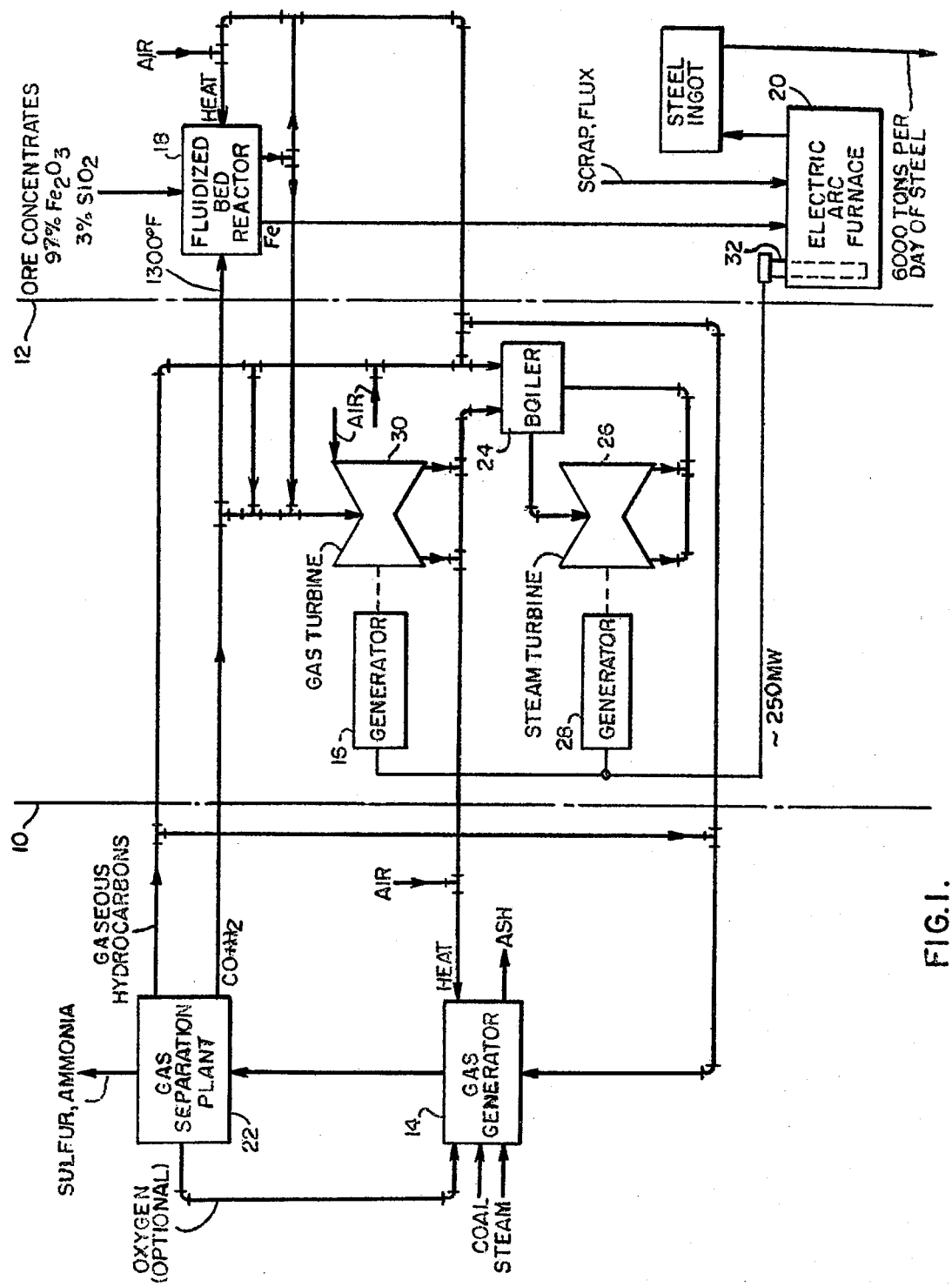
FIG. 1 is a diagrammatic view of one embodiment of a direct reduction process of iron ore.

As shown in FIG. 1 an integrated steel plant constructed in accordance with this invention is divided into separate subsystem by dot-dash lines 10 and 12. The system on the left of line 10 is a fuel conversion system. The power generation system is disposed between lines 10 and 12. On the right of the line 12 is the system for ore reduction and steel refining.

The primary element of the fuel conversion system is a gas generator 14. The primary element of the power generation system is a generator 16. The ore reduction and steel refining subsection includes a fluidized bed 18 and an electric arc furnace 20.

Associated with the gas generator 14 is a gas separator 22. Raw coal enters the gas generator together with steam, optional amounts of oxygen, as well as spent gas from the fluidized bed 18 containing carbon monoxide and hydrogen. The gaseous product from the gas generator 14 is transmitted to the gas separator 22 where sulfur, ammonia, and hydrocarbon compounds are removed to provide a fuel gas containing approximately equal amounts of carbon monoxide and $H_2$ which gas is used for the redution of iron ore in the fluidized bed 18.

The power production system between the lines 10 and 12 utilizes some of the gaseous hydrocarbons from the gas generator 22 for operating a boiler 24 where steam is generated for a turbine 26, which operates a generator 28. Another part of the gaseous hydrocarbons is used for operating a gas turbine 30 for operating the generator 16. For a plant of substantial size producing 3000 tons of steel a day the combined output of the generators 16 and 28 should provide the order of about 250 MW of power which is transmitted to one or more electrodes 32 in the electric arc furnace 20.

In the ore reduction and steel refining subsystem to the right of line 12, a relatively pure ore concentrate containing about 97% $FeO_3$ and about 3% $SiO_2$ is introduced into the upper end of the fluidized bed 18 where it is reduced to iron by the fuel gas in accordance with the following formula:

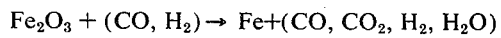

$$Fe_2O_3 + (CO, H_2) \rightarrow Fe+(CO, CO_2, H_2, H_2O)$$

The gas enters the fluidized bed at a temperature of approximately 1300°F. In addition, a portion of the spent gas from the upper end of the fluidized bed 18 is returned to the bed together with a mixture of air as required. Other portions of the spent gas are returned to the system such as the gas turbine 30 as well as to the gas generator 14.

The reduced iron metal, as a product of the fluidized bed 18, is charged into the electric arc furnace 20 together with amounts of scrap which may constitute up to about 40% of the charge. In addition, fluxing materials such as CaO and $SiO_2$, are added to provide a slag in the furnace and facilitate the refining operation. The resulting refined steel is tapped from the furnace 20 in the conventional manner such as into ingot molds.

Figure 2:
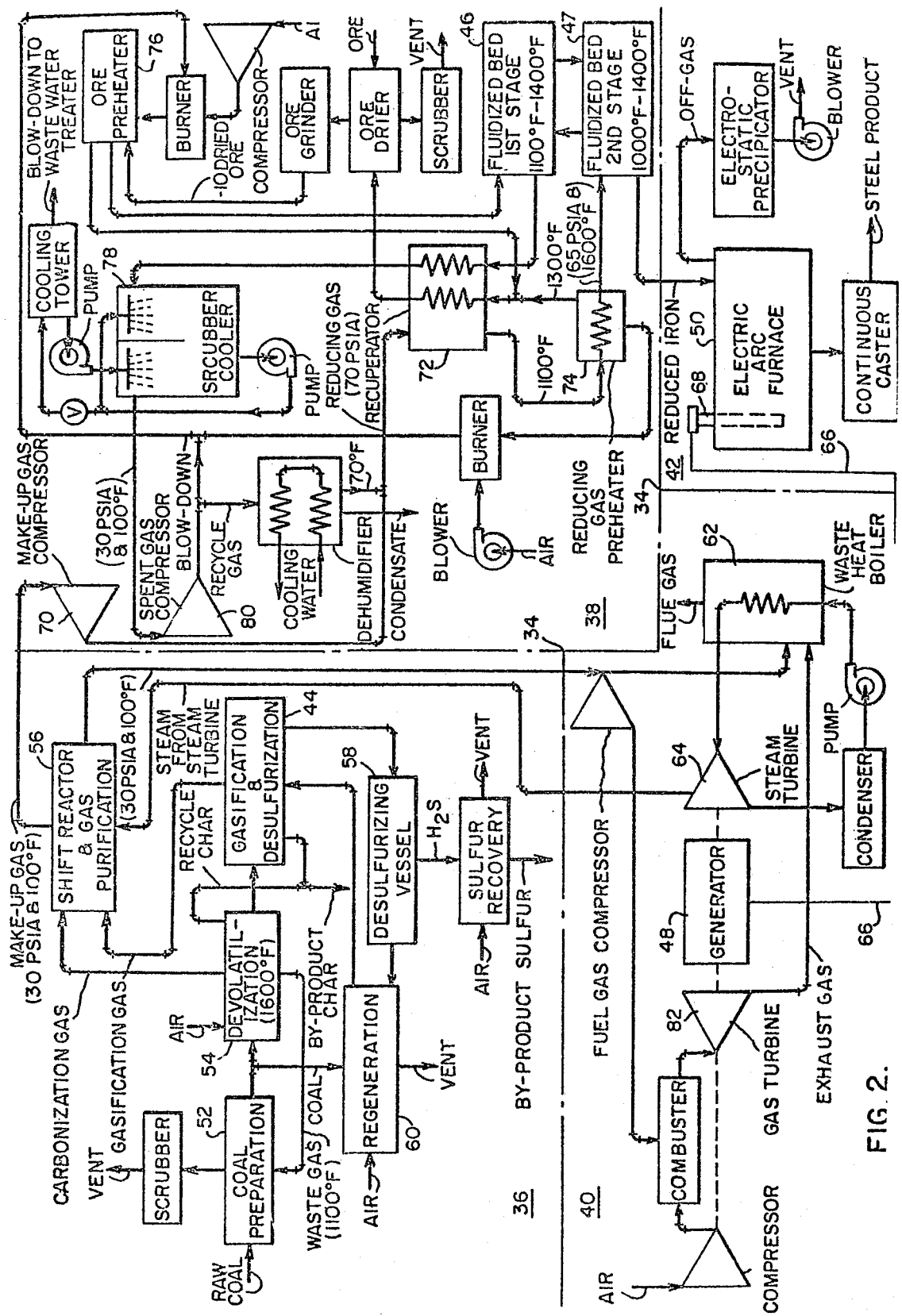
FIG. 2 is a diagrammatic view of another embodiment of a process for the direct reduction of iron ore.

Another embodiment of the invention is that shown in FIG. 2.

It discloses an integrated steel plant that is divided into four subsystems by a dot-dash line 10. The subsystems include a fuel-conversion subsystem generally indicated at 36 in the upper left-hand portion of the drawing, an ore reduction subsystem generally indicated at 38 in the upper right-hand portion, a power generation subsystem 40 in the lower left portion, and a steel making subsystem 42 in the lower right portion. The primary element of the fuel conversion subsystem 36 is a gas producer 44. The primary element of the ore reduction subsystem 38 is an ore reduction reactor or fluidized bed 46. The primary element of the power generation subsystem 40 is a power generator 48. Finally, the primary element of the steel making subsystem 42 is a steel refining furnace or electric arc furnace 50.

The fuel conversion subsystem 36 also includes a coal preparation station 52 where the raw coal entering the system is crushed to a desired size, such as ranging from about 40 mesh up to one-half inch, and where the coal is provided with a partially pre-oxidized surface to prevent it from caking.

Thereafter the coal moves to a devolatilization station 54 where the coal is converted to coke at a temperature of about 1600°F, whereby gases including steam, carbon dioxide, hydrocarbons, and sulphur are withdrawn and recirculated to the coal preparation station 52, and the carbonization gases including methane and carbon monoxide are withdrawn to a shift reactor 56. The coke then moves from the station 54 to the gas producer 44 where gasification and desulphurization occurs. This process consists of devolatilization of the coke at about 1600°F and a pressure of 44 psia. A stream of re-cycle gas is used to fluidize the resultant char in a desulphurizing vessel 58. Dolomite (MgO·CaO) is showered through a char bed which acts as a sulphur acceptor in accordance with the following formula:

$$MgO \cdot CaO + H_2S \rightleftharpoons MgO \cdot CaS + H_2O$$

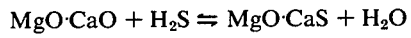

Thereafter, the sulphurized dolomite is re-generated at re-generation station 60 to recover sulfur and the dolomite is then returned to the vessel 44.

The shift reactor and gas purifier 56 accepts the carbonization gas from the devolatilazation station 54 and the gasification gas from the producer 44 and issues two product gases; namely, a make-up gas and a fuel gas. The make-up gas containing, in mol percent, about 95% $H_2$, 4.45% $CH_4$, 0.15% CO, and 0.40% $N_2$, is conveyed to the ore reduction subsystem 38 where it is used in the ore reduction reactor or fluid bed 46. In areas where low cost natural gas is available, this gas may be used to replace a part or all of the gas produced by gasification of coal as described above. Such gas is then conveyed through the shift generator and the coal gasification plant can be eliminated.

The fuel gas issuing from the shift reactor and gas purifier 56 is composed, in mol percent, of about 44.0% $H_2$, 55.45% $CH_4$, 0.17% CO, and 0.38% $N_2$, and is conveyed to the power generation subsystem 40 where it is burned to produce steam in a waste heat boiler 62 for a steam turbine 64 for operating the generator 24, as well as fuel for the gas turbine 82. Power generated by the generator 48 is transmitted through a conduit 66 to an electrode 68 in the electric arc furnace 50.

When the make-up gas enters the ore reduction subsystem 38, it is compressed by a gas compressor 70 to a pressure of substantially 70 psia and then passes through a heat recuperator 72 where its temperature is increased from less than 100°F to about 1100°F. Thereafter the make-up gas may be further heated by passing it through a pre-heater 74 to a temperature of about 1600°F at a pressure of about 65 psia, prior to the introduction of the gas into the second stage 47 of the ore reduction reactor or fluidized bed.

Operation of the first stage 46 and the second stage 47 of the fluidized bed is substantially comparable to that disclosed in an article entitled: "NU-IRON, A Fluidized-Bed Reduction Process" by T. F. Reed and J. C. Agarwal, pages 317 to 320, Journal of Metals, April, 1960. Generally, the first and second stages 46 and 47 are operated at a temperature ranging from about 1100° to 1400°F and preferably at 1300°F in a fluidized bed atmosphere of make-up gas consisting of essentially 95 mol percent of hydrogen as set forth above. In the first stage 46, iron ore, such as hematite ($Fe_2O_3$) is reduced by the reducing gas which includes a predominant amount of hydrogen, to FeO. Subsequently, the iron oxide (FeO) is reduced in the second stage 47 to solid essentially pure iron particles by the gas. The solid iron particles then are conveyed to the electric arc furnace 50.

As shown in subsection 38 ore enters the system through a pre-heater 76 before it enters the ore reduction reactor or fluidized bed stage 46. Upon leaving the first stage 46 of the fluidized bed, the spent gas passes through the recuperator 72 where it yields part of its heat to preheating the incoming reducing gas. Thereafter the spent gas passes through a cooler 78 from where it passes through a compressor and is introduced partially into the incoming line of the reducing gas. Another part of the spent gas is used for heating the pre-heaters 74 and 76.

The fuel conversion subsystem 36 of the drawing is basically a gas generation-chemical separation plant which essentially replaces the coke plant and the lower half of the blast furnace in a conventional steel plant. It is understood that the lower part of a blast furnace is fundamentally a generator of CO gas to reduce iron oxide in the top of the furnace and it also melts the reduced iron. Generally, coal is fed into the gas generator and heated to a temperature sufficiently high to distill off volatiles. The remaining char reacts with steam or oxygen to produce CO and/or $H_2$. The gaseous output from the generator is transmitted to a chemical plant where the condensible hydro-carbons, sulphur compounds, and ammonia compounds are separated from the remainder of the gaseous products. The by-products go to a conventional chemical plant for further refining. The gaseous hydrocarbons (mainly methane, $CH_4$) are separated from CO and $H_2$ because hydro-carbons are undesirable in the subsequent or reduction step. That separation may be made at cryogenic temperatures of which a by-product may be oxygen which could be used in the gas generator.

In the power generation subsystem 40 the CO and $H_2$, the gaseous hydro-carbons, liquid hydro-carbons, and/or the gaseous discharge from the ore reduction unit are used either individually or in a desirable proportion to burn with air in a gas turbine 82 in conjunction with the steam turbine 64 to operate the generator 48. All or part of the discharge from the gas turbine 82 is diverted to supply heat to the gas generator. Alternatively it may be mixed with gaseous hydrocarbons from the gas separation plant and burned with air in the steam boiler. The ore reduction subsystem 38 and the steel making subsystem 42 represent the ore reduction, melting and steel making part of a steel plant. Thus, they replace the top half of a blast furnace and the basic open hearth furnace or basic oxygen furnace in a conventional integrated steel plant.

An ore concentrate with as high an $Fe_2O_3$ content as is economically feasible is fed into the ore reduction reactor or fluidized bed reactor 22 probably as a pre-sintered pellet or briquette. Inasmuch as a large quantity of slag is not required in this process to remove sulphur, which is usually derived from coke in the blast furnace process, ore benefication processes can be used at a low cost to provide a higher purity concentrate in this plant than to the blast furnace plant. Carbon monoxide and hydrogen gas from the gas generator 44 enters the bottom of the fluidized bed reactor 47 and reduces the $Fe_2O_3$ to particles of hot iron metal. The optimum reducing temperature is between 1000°F and 1400°F whereby the iron is not melted or tightly sintered so as to influence the reduction reaction. The density of the iron particles about 7.3 is so much greater than that of hematite is about 5, that the iron particles settle to the bottom of the reactor and can be conveyed to the arc furnace. The reactor of $Fe_2O_3$ with CO is endothermic and with $H_2$ it is exothermic. However, added heat is required in the reactor by either preheating the gas or the ore concentrate or both or using an external heater.

The gaseous discharge from the reactor is a mixture of CO, $CO_2$, $H_2$, and $H_2O$ plus any $N_2$ which entered at the gas generator. The exhaust gas contains about two mols of CO to one mole of $CO_2$, and one mol of $H_2$ to two mols of $H_2O$. The ratio of CO to $CO_2$ and $H_2$ to $H_2O$ is higher in a fluidized bed reactor than from a blast furnace. The gas has a significant heating value when burned with air and is subsequently used to externally heat the reduction reactor (fluidized bed), as fuel for the gas turbine and steam boiler, as well as for other heating purpose such as the gas generator.

The reduced iron metal is recovered from the fluidized bed and is charged into the arc furnace 50 mixed with an economically optimum amount of scrap and an appropriate flux. The resulting molten steel is poured into ingot molds or is continuously cast into slabs which are subsequently processed in a conventional manner. The slag is withdrawn from time to time.

The following example is illustrative of the present invention:

EXAMPLE

Hematite ore essentially ($Fe_2O_3$) is reduced to FeO in the first stage 46 of the fluidized bed and subsequently reduced to 90 to 95% by weight of iron in the second stage 47 by about 85% hydrogen by volume. In the two stages from about 32 to 36% of the hydrogen in the reducing gas is converted to $H_2O$. Since the concentrated hydrogen stream is 95% by volume of hydrogen, the 85% by volume of hydrogen reducing gas is obtained by de-humidifying and recycling part of the spent gas and mixing it with the 95% $H_2$ make-up gas. The blow-down gas from the spent gas compressor is about 79% $H_2$ and 20% $CH_4$, an excellent fuel. For a 3000 ton of steel per day system the amount of blow-down gas is $0.76 \times 10^6$ standard cubic feet per hour. About 86% of the blow-down gas is required for preheating the reducing gas and the ore, assuming no heat losses to the atmosphere.

The outputs for the several parts of the fuel conversion subsystem 36 to match a 3000 ton per day steel production is:

| | |
|---|---|
| 95% hydrogen | $3.12 \times 10^6$ SCFH |
| Fuel gas | $555 \times 10^6$ Btu/hr |
| Char | $473 \times 10^6$ Btu/hr |
| Sulphur Recovery | 29,100 long ton/year |

The electrical energy required to produce a ton of carbon steel in an electric furnace with cold feed is about 450 kwhr. For a feed temperature of 1300°F the energy requirement is about 320 kwhr/ton and for a 3000 ton per day of steel the power requirement is about 40 MW.

The power requirements for the ore reduction subsystem 14 are as follows:

| | MW |
|---|---|
| Gas compressors | 8.0 |
| Water pumps | 0.25 |
| Air compressor | 1.5 |
| Misc. | 0.25 |
| | 10.00 |

The total power requirements are:

| | MW |
|---|---|
| Arc furnace | 40.0 |
| Ore reduction | 10.0 |
| Fuel conversion | 0.75 |
| Power generation | 1.10 |
| | 51.85 |

The fuel conversion system requires 229,000 lb. of steam per hour for the gas shift reactor 56. In practice this requirement is met by extracting steam from the steam turbine 40 at the appropriate point. In this analysis the steam is charged at the rate of $0.25/1000 lbs. rather than estimating the cost when using an extraction steam cycle.

It should be understood that the several subsystems 36, 38, 40 and 42 are generally conventional systems that are known and used in separate industries such as the coal and steel industries.

It is understood that the above specification and drawing are merely exemplary and not in limitation of the invention.

What is claimed is:

1. A process for producing steel and the production of gases, the reduction of iron ore, generation of power and utilization of the power and reduced ore to form steel, the steps comprising:

a. converting carbonaceous fuel to a mixture of at least two gas streams, one of said gas streams containing a high proportion of hydrocarbons and other stream containing reducing gases including a high proportion of CO and $H_2$;

b. conveying the hydrocarbons and distributing a portion thereof to a
    1. gas turbine;
    2. a boiler, and recycling the balance;

c. conveying the reducing gases and distributing a portion thereof to:
    1. a fluidized bed reactor; and
    2. the gas turbine;

d. reacting the reducing gases with iron ore in the fluidized bed reactor to produce iron particles and heat;

e. transferring the reduced iron particles to an electric arc furnace and adding thereto scrap and fluxes;

f. reacting a portion of the gaseous hydrocarbons, reducing gases, spent gases and heat from the fluidized bed reactor in the gas turbine coupled to an electrical generator for the production of electrical power;

g. generating steam by reacting in a boiler the combustion products of the gas turbine, a portion of the spent gases from the fluidized bed reactor and a portion of the gaseous hydrocarbons;

h. conveying the steam to a steam turbine connected to an electrical generator for producing electrical power; and i. melting the contents of the electric arc furnace by utilizing the generated electrical power to form an arc thereby supplying the heat necessary for melting and refining said contents of said furnace for the production of steel.

2. The process of claim 1 wherein the step of reacting the reducing gases with iron ore particles to convert the latter to iron in the fluidized bed reactor is carried out at a temperature of between 1000°F and 1400°F.

3. The process of claim 1 wherein the step of commingling the reducing gases with iron ore particles occurs in two stages, the iron ore being reduced to FeO in the first stage and to Fe in the second stage.

4. The process of claim 1 wherein step (a) the combustible reducing gases are desulfurized.

5. The process of claim 1 wherein step (a) the coke is devolatilized at about 1600°F.

* * * * *